United States Patent [19]

Frey

[11] Patent Number: 4,638,449

[45] Date of Patent: Jan. 20, 1987

[54] MULTIPLIER ARCHITECTURE

[75] Inventor: Alexander H. Frey, Cabin John, Md.

[73] Assignee: International Business Machines Corporation, Armonk, N.Y.

[21] Appl. No.: 765,567

[22] Filed: Aug. 14, 1985

Related U.S. Application Data

[63] Continuation of Ser. No. 504,358, Jun. 15, 1983, abandoned.

[51] Int. Cl.[4] .............................................. G06F 7/52
[52] U.S. Cl. .................................................. 364/760
[58] Field of Search ....................... 364/757, 759, 760

[56] References Cited

U.S. PATENT DOCUMENTS

| | | | |
|---|---|---|---|
| 3,023,962 | 3/1962 | Stafford | 364/787 |
| 3,100,835 | 8/1963 | Bedrij | 364/788 |
| 3,100,836 | 8/1963 | Paul et al. | 364/788 |
| 3,275,812 | 9/1966 | Coates, Jr. et al. | 364/787 |
| 3,316,393 | 4/1967 | Ruthazer | 364/788 |
| 3,346,730 | 10/1967 | Hanson | 364/787 |
| 3,553,446 | 1/1971 | Kruy | 364/788 |
| 3,743,824 | 7/1973 | Smith | 364/788 |
| 3,902,055 | 8/1975 | Haims et al. | 364/787 |
| 3,925,651 | 12/1975 | Miller | 364/787 |
| 3,925,652 | 12/1975 | Miller | 364/787 |
| 3,987,291 | 10/1976 | Gooding et al. | 364/787 |
| 3,993,891 | 11/1976 | Beck et al. | 364/787 |
| 4,139,894 | 2/1979 | Reitsma | 364/788 |
| 4,153,938 | 5/1979 | Ghest et al. | 364/760 |
| 4,203,157 | 5/1980 | Daniels et al. | 364/788 |
| 4,215,419 | 7/1980 | Majerski | 364/760 |
| 4,276,607 | 6/1981 | Wong | 364/760 |
| 4,546,446 | 10/1985 | Machida | 364/757 |

OTHER PUBLICATIONS

Shlomo Waser, "High-Speed Monolithic Multipliers for Real-Time Digital Signal Processing," *IEEE Computer*, Oct. 1978, pp. 19–29.

Primary Examiner—James D. Thomas
Assistant Examiner—Dale M. Shaw
Attorney, Agent, or Firm—John E. Hoel

[57] ABSTRACT

An improved multiplier is disclosed for multiplying a first operand times a second operand, which includes a Booth-type translator having an input connected to receive the first operand, for translating the binary expression of the first operand into a sequence of signed digits. The multiplier further includes a partial product generator having a first input connected to the output of the translator and a second input connected to receive the second operand, for multiplying the translated first operand times the second operand and outputting partial products consisting of signed digits. The multiplier further includes an array of adders, each adder having an input connected to two of the signed digits output from the partial product generator, for providing a sum consisting of a sequence of signed digits. The multiplier further includes an inverse translator having an input connected to the output of the adders, for operating on the sequence of signed digits output from the adders, for providing a conventional binary expression for the product of the first and the second operands. The improved multiplier is capable of faster operation than has been available in the prior art.

2 Claims, 3 Drawing Figures

MULTIPLIER ARCHITECTURE

This is a continuation of application Ser. No. 504,358, filed June 15, 1983, now abandoned.

FIELD OF THE INVENTION

The invention disclosed broadly relates to digital multipliers and more particularly relates to binary digital multipliers.

BACKGROUND OF THE INVENTION

Existing multipliers which operate on pairs of binary operands suffer from several deficiencies which contribute to the prolongation of their multiplication operations. For example, the addition of the partial products requires the propagation of carry bits which can require an extensive increment in time necessary for the carry bits to fully propagate through all of the binary bit orders. A second problem is that the addition of the partial products is conventionally done in a sequential manner in order to avoid undue complexity in the adder circuitry. Parallel operations, which could otherwise shorten the duration of the addition of the partial products, cannot be conveniently carried out without complex arithmetic circuitry capable of handling multiple carry bits generated in any particular bit column.

OBJECTS OF THE INVENTION

It is therefore an object of the invention to provide an improved multiplier.

It is a further object of the invention to provide an improved multiplier having a shorter duration for its operation.

It is still a further object of the invention to provide an improved multiplier which enables the simplified addition of partial products in parallel.

It is yet a further object of the invention to provide an improved multiplier which eliminates the propagation of binary carry bits in the addition of its partial products, in an improved manner.

It is yet a further object of the invention to provide an improved multiplier which has a duration for the addition of partial products which grows at a rate less than a linear rate with respect to the size of the operands multiplied.

SUMMARY OF THE INVENTION

These and other objects, features and advantages of the invention are accomplished by the improved multiplier disclosed herein. An improved multiplier is disclosed for multiplying a first operand times a second operand, which includes a Booth-type translator having an input connected to receive the first operand, for translating the binary expression of the first operand into a sequence of signed digits. The multiplier further includes a partial product generator having a first input connected to the output of the translator and a second input connected to receive the second operand, for multiplying the translated first operand times the second operand and outputting partial products consisting of signed digits. The multiplier further includes an array of adders, each adder having an input connected to two of the signed digits output from the partial product generator, for providing a sum consisting of a sequence of signed digits. The multiplier further includes an inverse translator having an input connected to the output of the adders, for operating on the sequence of signed digits output from the adders, for providing a conventional binary expression for the product of the first and the second operands. The improved multiplier is capable of faster operation than has been available in the prior art because it is capable of adding pairs of partial products simultaneously, in parallel by virtue of the signed digit mode of expression for those partial products and the special rules of addition provided by the adders. In addition, by virtue of the signed digit form for the partial products which are added by the adders, carry bits are not propagated beyond the adjacent higher order signed digit position. In this manner, the time consumed in prior art multipliers in carrying out the process of adding the partial products is significantly reduced because lengthy carry bit propagation is avoided. Indeed, the time necessary to carry out the addition of partial products in the improved multiplier increases at a lower rate proportional to the logarithm to the base 2 of the number of binary bits in the operands, and this can be contrasted with the linear rate of increase of the partial product addition time in prior art multipliers of comparable architectural simplicity.

DISCUSSION OF THE PREFERRED EMBODIMENT

Figure 1:
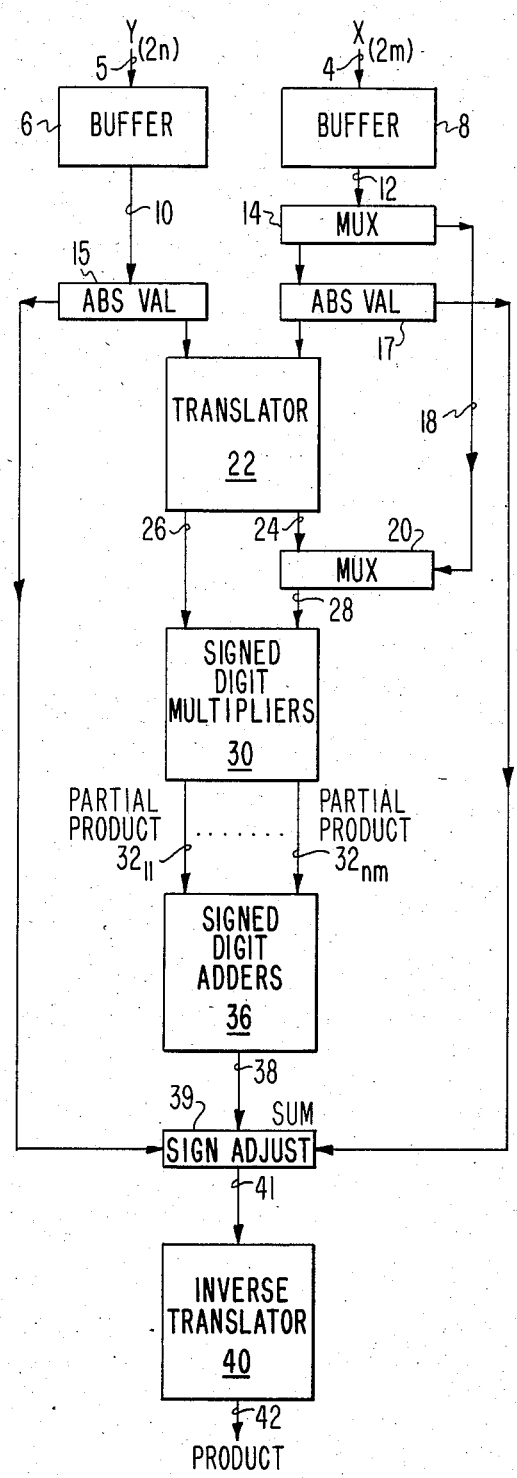
FIG. 1 is a functional block diagram of the improved multiplier invention.
Figure 2:
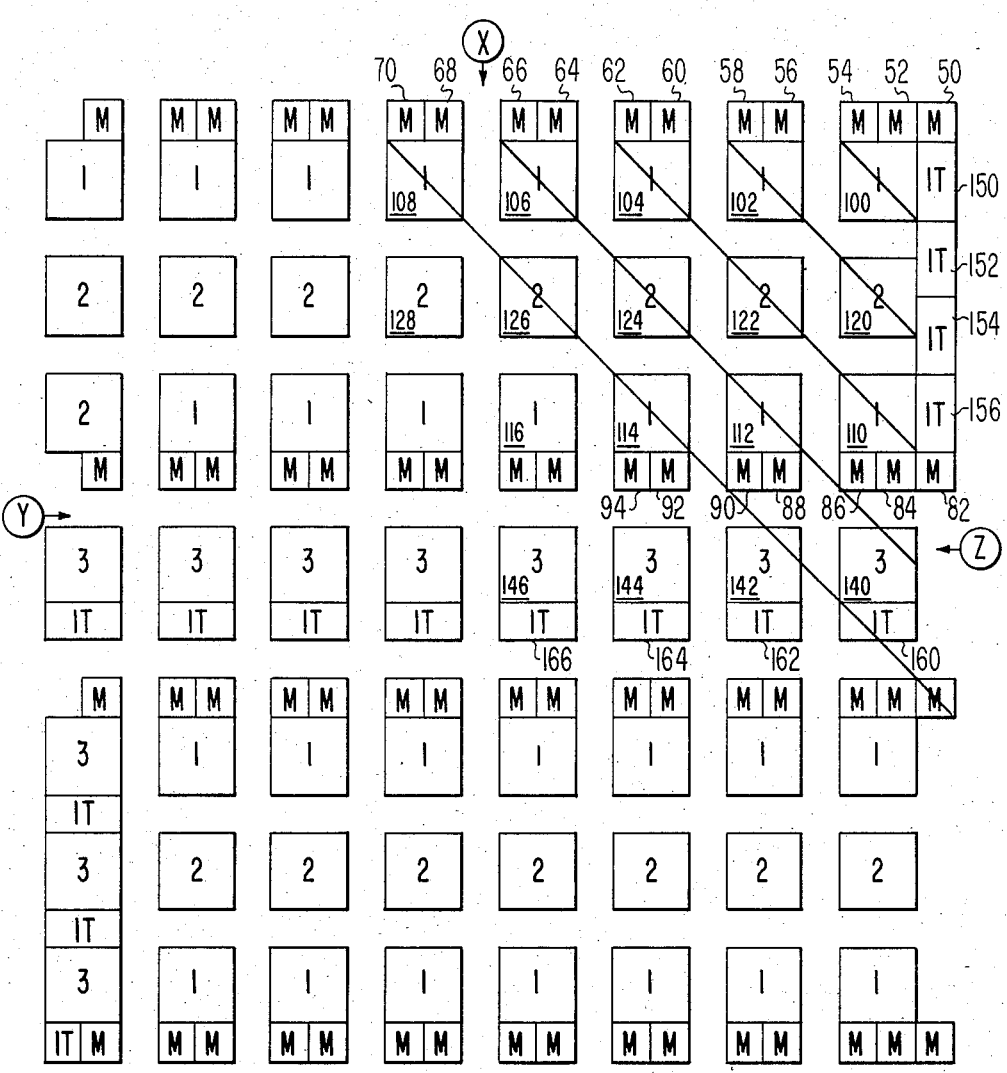
FIG. 2 is a schematic diagram of an improved organization for the addition of the partial products in the multiplier invention.
Figure 3:
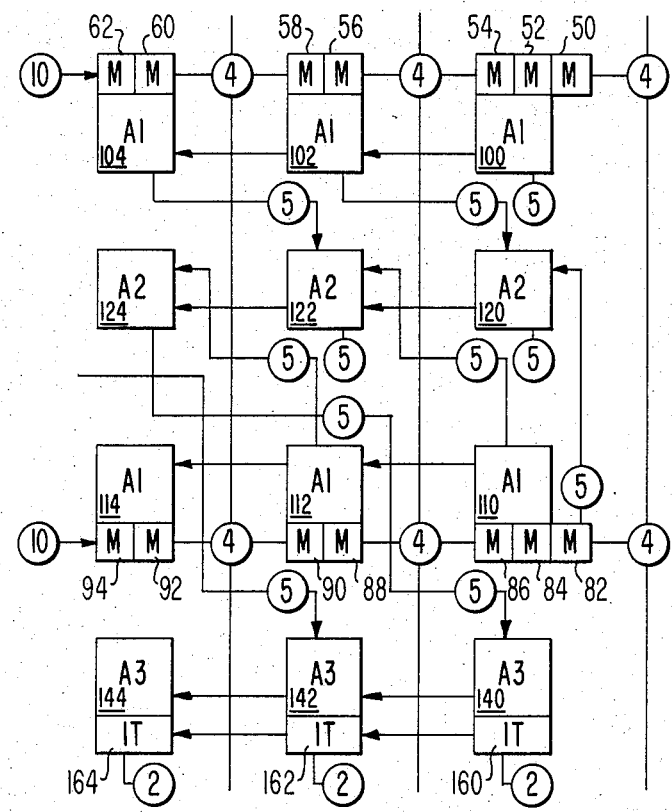
FIG. 3 is a detailed view of a portion of the functional elements described in FIG. 2.

The architectural features of a new multiplier are disclosed in FIGS. 1 to 3, which is faster in operation than are prior art multipliers.

The multiplier design summary of Table 1 shows four stages of the design. First is the translate stage of the two inputs to the multiplier X and Y. This translate is similar to the conventional Booth-type of translate. After the Booth translate, the multiply by single signed digits takes place. The multiplier forms partial products by a shift and a multiplex operation to invert the signs when necessary. Following the multiply, the adder tree combines the partial products. It is a no ripple adder designed for a pair of signed digit inputs and it absorbs the carry from the previous column of adders. This can be referred to as a "carry sponge" adder. After all the adds are completed and the final multiplied number comes out of the last adder stage, the number is still in the signed digit form in which it has both plus and minus digits in various bit positions. Before the answer can be output, an inverse translate is necessary to put it back into standard binary form. That inverse translate does involve a ripple which is intended to be rippled through transmission gates for high speed and which is easily implemented with FET transmission gates. Thus, there are four stages: translate, multiply, adder and inverse translate.

The Translate Stage

A translate is done by the translator 22 of FIG. 1, for every even pair of bits from the Y input, as shown in Table 2. It is possible to translate any pair of bits from the X input. The translate is based upon the following principle. Given a pair of bits $X_i$ and $X_{i+1}$, if the high order bit $(X_{i+1})$ is a 1, it would automatically generate a carry-out and replace that bit by a −1. Thus that bit which appears in the "2's" position of that pair of bits will generate a carry-out of four and be replaced by a −2 (4−2 being equivalent to the 2 that was there in the first place). Therefore to determine the proper value for the pair of bits (Xi and Xi+1) we also need to look at bit Xi−1 to see if that generated a carry-in. If it generates a carry-in, the carry-in has the same weight as Xi. The carry-in from Xi−1 has the same weight as Xi. Therefore, the translate of the three bits Xi−1, Xi and Xi+1 is shown in Table 2, where a 1 in the column for Xi or Xi−1 corresponds to a 1 in the Xi position and a 1 in the column Xi+1 corresponds to a −1 in that column or a −2 in the number. For example on the first row, the Xi+1 is a 1, therefore we have a −2, Xi is a 1 and Xi−1 is a 1, they add up to a +2 and the net result is Xi'=0. All the outputs then are between +2 and −2.

The Multiply

As shown in Table 3, since the multiplier expression coming into the multiply operation has now been translated so that it takes on values between +2 and −2, the multiply operation carried out by the multiplier 30 of FIG. 1 consists of either a one-bit shift or no shift or zero and the sign change if the input is minus. So multiplying by Y equal to +2 constitutes shifting the input X values up one position. That is the Xi−1 inputs take the place of the Xi inputs, as shown in Table 3.

The Adder

As shown in Table 4a, the basic adder cell for the adder tree 36 of FIG. 1 takes an input between −2 and +3. Although the multiplier provides inputs between −2 and +2, the adder outputs are between −2 and +3. Therefore in the adder tree, the adder inputs must be allowed to be between −2 and +3. The adder will accept two inputs between −2 and +3 and will receive a carry-in of −1, 0 or +1. It will generate a carry-out of −4, 0 or +4, independent of the carry-in (it is very important that it be independent of the carry-in) and an output between −2 and +3. This is carried out in the following way. Add the two inputs A and B, and if the resulting sum is between +3 and +6, generate a plus carry-out. If the resulting sum is between −1 and +2, generate a zero carry-out. If the resulting sum is between −4 and −2, generate a minus carry-out. Then the sum of A+B minus the carry-out that has been generated, represents a ±4 or a 0 and results in a number that is between −1 and +2. And adding the carry-in to that number leaves you with a number of between −2 and +3 and the carry-in does not affect the carry-out.

When using the adder as shown in Table 4a it is necessary to translate both the X operand and the Y operand as shown in Table 2. However, it is possible to avoid the need for translating the operand X by using the basic adder cell as shown in Table 4b. In this case, the inputs to the adder can both be between −3 and +3 and the output generated by the adder is also between −3 and +3. In both cases the carry-out generated from the adder is independent of the carry-in.

The Inverse Translate Operation

As shown in Table 5, the inverse translate operation, which is carried out by the inverse translator 40 of FIG. 1, receives an input from the last adder that is between −2 and +3. The multiplier expression at the start is assumed to have a positive value for the input. In the translate process, an adjustment is made to turn negative numbers to positive. At the output, the result is made negative when necessary, that is, when a positive number was multiplied by a positive number, the final output is made negative by reversing the signs of the output of the last adder which is the input to the inverse translate. This means that the inverse translate must be capable of operating on numbers between −3 and +3. The purpose of the inverse translate is to eliminate any negative values from this form of the number. The basic principle used is to replace a −1 in any bit column by a −1 in the next higher bit column and a +1 in that bit column. That is, use the fact that −1=−2+1. Thus, if the input to the inverse translator is between −3 and −1, you automatically generate a −1 carry-out. If the value of the input to the inverse translate is zero, the carry-out is equal to the carry-in, and if the value of the input to the inverse translate is positive, the negative carry-out is zero. The outputs for the values coming into this particular inverse translate are given in Table 5 where the columns represent the output for various input states depending upon whether the minus carry-in is true or false, where the one's row represents true for the minus carry-in and the zero row represents false for the minus carry-in. Notice that where a minus carry-out was generated, +4 was added to the number. That completes the basic concept of the multiplier.

FIG. 1 illustrates a functional block diagram of the improved multiplier invention. The first operand X can be an eight bit, 16 bit, or a 24 bit binary number input on line 4 to the buffer 8. The second input Y is also a corresponding 8 bit, 16 bit, or 24 bit binary number input on line 5 to the buffer 6. The number of bits in the operand X is not necessarily the same as the number of bits in the operand Y. In addition, as long as the number of bits including sign in each operand is even, there is no limit as to their relative size.

The output of each respective buffer, 6 and 8, is output on the respective lines 10 and 12. The output of the buffer 6 is input to the absolute value generator 15 which outputs the absolute value of the operand Y to a first input of the translator 22. The output 12 of the buffer 8 passes through the multiplexer 14 and will either pass around the translator 22 via line 18 or will pass through the absolute value generator 17 to a second input to the translator 22. The operation of taking an absolute value produces an odd number of bits to be input to the translator. The translator 22 carries out the operations described in Table 2. The high order pair always must have a zero in the higher order bit position in order to avoid creating the need for a still higher order pair.

First output 26 of the translator 22 is input to the multiplier 30, and the second output of the translator 24 is passed to the multiplexer 20 and then over the line 28 to the second input of the multipliers 30. If the multiplexer 14 had been set so that the operand X passed over the line 18 directly to the multiplier 30, it would then pass through the multiplexer 20. Alternately, if the operand X had passed through the multiplexer 14 to the translator 22, then the output 24 from the translator 22 would have passed through the multiplexer 20 over the line 28 to the multipliers 30. The setting of the multiplexers 14 and 20 is dependent on the functions implemented in the adders 36. If the adders 36 are designed to implement the functions as described in Table 4a, then the multiplexers are set to pass the values of the operand X through the translator. On the other hand, if the adders 36 are designed to implement the functions described in Table 4b, then the multiplexers 14 and 20 are set to bypass the translator 22 and send the values of the operand X over the line 18.

The multipliers 30 operate on the principle described in Table 3. When the input operand X has 2M binary bits and the operand Y has 2N binary bits, then a total of N×M partial products each consisting of a single signed digit are produced by the multipliers 30. These partial products are output on the lines $32_{11}$ through $32_{NM}$ as is illustrated in FIG. 1. The notation used in Table 3 is that I takes on values from 1 through 2M and J takes on values from 1 through 2N.

The partial products output on line $32_{11}$ through $32_{NM}$ are input to the adders 36 which operate in accordance with the illustration in Table 4. All partial products where the sum of the two subscripts I and J are equal, are added together in the adders 36 as illustrated in FIG. 2. For example, the partial product $P_{62}$ input on line $32_{62}$ will be adder to the partial product $P_{44}$ input on line $32_{44}$ and the result of that sum will be added to the partial product $P_{26}$ input on line $32_{26}$. The self-absorptive quality of the carry operations as described above in Table 4 enables the combining of sums in this manner to be done in parallel operating adders, simultaneously. This is schematically illustrated in FIGS. 2 and 3. The output of the adder is M+N signed digits which are passed through the sign adjuster 39 which restores the appropriate sign to the outputs of the adders 36 corresponding to the signs of the operands X and Y. The output of the sign adjuster 39 is input over line 41 to the inverse translator 40 whose principle of operation is described in Table 5. The output from the inverse translator 40 on line 42 is the desired product of the operands X and Y, expressed in normal binary notation having 2(M+N)−1 binary digits.

FIG. 2 shows a layout for a physical embodiment of the signed digit partial product generators, signed digit adders and inverse translator shown in FIG. 1. A more detailed description of the connectivity of a portion of FIG. 2 is shown in FIG. 3 which shows the upper right-hand portion of FIG. 2 in greater detail. In FIG. 2, items 50 through 94 represent partial product generators, each of which has a single signed digit as an output. The inputs to the partial product generators 50 through 94 are the translated values of the operands X and Y shown in FIG. 2 as coming from the top of the figure and the left-hand side of the figure. The outputs of the partial product generators 50 through 94 (which are labeled M in FIG. 2) provide the inputs to the first set of basic adder cells 100 through 116 (which are labeled 1 in FIG. 2), all of which will operate simultaneously. The first set of adder cells to operate simultaneously are the adders numbered 100 through 116. The partial product generators are arranged in two banks, 50 to 70 and 82 to 94. The first set of adders are arranged in two banks, 100 to 108 and 110 to 116. The outputs of partial product generators in the first bank are input to the adders in the first bank and the outputs of the partial product generators in the second bank are output to the adders in the second bank. Each of these first adders 100 to 116 receives two signed digits from the partial product generators 50 through 94 and produce a single signed digit output. The signed digit outputs from the adders 100 through 116 provide the signed digit inputs to the second set of adders numbered 120 to 128 (which are labeled 2 in FIG. 2). Thus, each of the adders 120 to 128 receives two signed digit inputs, one from an adder in the first bank 100 to 108 and one from an adder in the second bank 110 to 116, and produces a single signed digit output which goes to one of a third set of adders 140 to 146 (which are labeled 3 in FIG. 2) which constitute the third level of adders operating sequentially. Thus, all of the first set of adders 100 to 116 operate in parallel followed by all of the second set of adders 120 to 128 which operate in parallel followed by all of the third set of adders 140 to 146 which operate in parallel to produce signed digit outputs which then go to the inverse translators 150 to 166 (which are labeled IT in FIG. 2).

In FIG. 3, which shows the detailed interconnection of the elements shown in FIG. 2, the small numbers in the circles indicate the number of wires which are intended to be used to carry the signed digit values from element to element in FIG. 3.

OPERATION OF THE INVENTION

A sequence of illustrative examples follow for the invention.

EXAMPLE 1

Table 6 shows the example of multiplying the number 23 which will be the X operand, times the number 41 which will be the Y operand. The binary expression for 23 is 010111 and the binary expression for 41 is 00101001.

The first step is to carry out the translation of the binary expression for 41 by means of the translate operation as illustrated in Table 2. The eight binary numbers are grouped into four pairs which are labeled from right to left as 2, 4, 6, and 8. The translation is carried out converting the binary expression for 41 into the sequence of numbers from left to right 1, −1, −2, 1, which is otherwise expressed in binary notation as (01) (0−1) (−10) (01).

With the translated form of Y expressed in this manner, the standard binary multiplication is carried out generating the array of four partial products shown in Table 6. The binary expression for the X operand is shown in line 1, the binary expression for the translated form of operand Y is shown in line 2, and the signed binary expression for the four partial products are shown in lines 3 through 6 of Table 6. The multiplication is carried out in accordance with the operation described in Table 3. The partial products are organized in pairs and those pairs having the same sum of I and J are vertically aligned so as to enable their addition to take place as follows.

The addition of the partial products is carried out with the first two partial products in rows 3 and 4 being added to form their sum in the row 7 and the addition of the partial products in rows 5 and 6 being added to form their sum in row 8. Then, the respective sums in rows 7 and 8 are added to form the combined sum in row 9. These additions are carried out in accordance with the principle described in Table 4.

In the final step, the inverse translation as was described in Table 5 is carried out on the sum in row 9, resulting in the true binary expression of the product of the operand X and Y in row 10.

As can be seen from reference to the example in Table 6, a substantial savings in the time necessary to carry out the multiplication is achieved by avoiding the necessity of rippling the carries in the addition of the partial products, this advantage accruing from the absorptive qualities of the carry in each respective pair of signed digits.

EXAMPLE 2

The operands X and Y are shown on lines 2 and 1 of Table 7. Those two operands would be input via lines 4 and 5 to buffers 8 and 6. Line 2 shows the operand X having decimal value 310 and the operand Y shown on line 1 having the value −493. Line 3 shows the translation of the absolute value of Y. The value of Y equal to −493 was passed through the absolute value circuit 15 to give the positive value corresponding to 493 also shown on line 1 and the translator 22 translated that value of Y according to the rules of Table 2 into the sequence of signed digits shown on line 3. Each of these signed digits takes on a value in the range −2 to +2 and provides one set of inputs to the signed digit multiplier 30. The operand X is sent to the signed digit multiplier bypassing translator 22 via line 18. The five lines 4 through 8 show the value of X being multiplied by each of the signed digits in the translated form of Y shown in line 3. This shows the binary representation of these partial products. The signed digit output of the same partial products is shown on lines 9 through 13. The only difference between lines 4 through 8 and lines 9 through 13 is the translation of the values to signed digit form as opposed to binary form. This is shown for the convenience of the reader. Each digit in rows 9 through 13 represents a partial product of signed digits from the operands X and Y. These partial products are aligned in columns corresponding to the digits which must be added together. It should be noted that because of the properties of the basic adder cell in which the carry-out is determined independently of the carry-in, that pairs of partial products may be added together simultaneously in order to speed up the operation of the multiplier. For example, in the middle column of the array shown in lines 9 through 13, there are five signed digits. Normal serial multipliers would require four consecutive additions in order to add those five digits using the basic adder cell described in Tables 4a or 4b. In particular, in this example, we will use the adder cell described in Table 4b. The first and second signed digits can be added together in parallel to the addition of the third and fourth digits in that column. Having done those two pairs of additions simultaneously, the two sums arrived at may be added together and that sum can then be added to the fifth and last digit in that column, thus requiring only the time of three additions rather than the time of four additions. It should further be noted that the time of three additions is sufficient to add up to eight digits in that column which in normal multipliers would require seven sequential additions to perform. This is the case that is normally found in 16×16 bit multipliers. The sums of lines 9 and 10 are shown on line 14. Notice that in the fourth column from the right, the digits 0 and −3 were added and the sum came out +1 with a carry of −1 being moved to the column immediately to the left, namely the fifth column from the right. It should further be noted that in the fourth column from the left, the input on line 10 took on the value −3 which would not have been allowed had the basic adder cell been built to conform to the rules of Table 4a rather than Table 4b. The sum of lines 11 and 12 is shown on line 15. Again, the fifth column from the right shows the addition of −3 and 0 to be +1 with a carry of −1 being moved to the sixth column from the right and producing the sum of −1 as the output in that column. The sum of lines 14 and 15 is shown on line 17. In this case, in the sixth column from the right, the values −1 and −1 add to produce −2. This is again a difference between the rules of Table 4b and the rules of Table 4a, where the sum of −1 and −1 in Table 4b does not produce a minus carry-out. Finally, the values on line 17 and line 18 are summed and the result is shown on line 19. Since the value of the operand Y was negative, and the value of the operand X was positive, we must do a sign adjust in order to correct the final output to reflect the minus value which is required. The values on line 19 appear at the output of the signed digit adders 36 and pass through the sign adjust 39 to produce the digits shown on line 21 which are passed via line 41 to the inverse translator. The inverse translator then produces the final binary output shown on line 22 which corresponds to the value −152830 in its two's complement form. This final product is then put out via line 42.

Thus the invention enables one to use the array of signed digit adders using either the rules of Table 4a or the rules of Table 4b to obtain a number of sequential adds to produce the final multiply which grows only with the log to the base 2 of the length of the operands as opposed to a sequence of add operations which grows linearly with the length of the operands.

Although specific embodiments of the invention have been disclosed, it will be understood by those of skill in the art that the foregoing and other changes in form and details may be made therein without departing from the spirit and the scope of the invention.

TABLE 1

DESIGN SUMMARY
Four Stages (Using Plus and Minus Values)

Translate X and Y (No Ripple, Similar to Booth)
Multiply (Shift and Multiplex for Sign, no Ripple)
Adder Tree (No Ripple Carry)
Inverse Translate (Ripple Through Transmission Gates)

TABLE 2

TRANSLATE FOR X AND Y
°For Positive Number (2's Complement)

| $X_{I+1}$ | $X_I$ | $X_{I-1}$ | → | $X_I'$ |
|---|---|---|---|---|
| 1 | 1 | 1 | | 0 |
| 1 | 1 | 0 | | −1 |
| 1 | 0 | 1 | | −1 |
| 1 | 0 | 0 | | −2 |
| 0 | 1 | 1 | | +2 |
| 0 | 1 | 0 | | +1 |
| 0 | 0 | 1 | | +1 |
| 0 | 0 | 0 | | 0 |

Translate X for Every I
Translate Y for I Even
°For Negative Numbers Use $\overline{X_I}$ for $X_I$ and Use $X_{15}$ for $X_{-1}$

TABLE 3

MULTIPLY

For $Y_j' = +2; X_I' \cdot Y_j' = +X'_{I-1}$
$Y_j' = -2; X_I' \cdot Y_j' = -X'_{I-1}$
$Y_j' = +1; X_I' \cdot Y_j' = +X_I'$
$Y_j' = -1; X_I' \cdot Y_j' = -X_I'$
$Y_j' = 0; X_I' \cdot Y_j' = 0$ For all I, j pairs with I and j even. Note that $-2 \leq X_I' \cdot Y_j' \leq +2$ for all I, j.

TABLE 4a

BASIC ADDER CELL

INPUTS: $-2 \leq A \leq +3$
$-2 \leq B \leq +3$
Carry In = −1, 0, +1

TABLE 4a-continued

BASIC ADDER CELL

OUTPUTS: Carry Out = −4, 0, +4 Independent of Carry In.
−2 ≦ C ≦ +3
For  +3 ≦ A+B ≦ +6, Carry Out = +4
     +1 ≦ A+B ≦ +2, Carry Out = 0
     −4 ≦ A+B ≦ −2, Carry Out = −4
Then A+B − (Carry Out) = −1, 0, +1, +2 and
−2 ≦ [A+B − (Carry Out)] + Carry In ≦ +3

TABLE 4b

BASIC ADDER CELL

INPUTS:  −3 ≦ A ≦ +3
         −3 ≦ B ≦ +3
         Carry In = −1, 0, +1
OUTPUTS: Carry Out = −4, 0, +4 Independent of Carry In
         −3 ≦ C ≦ +3
For  +3 ≦ A+B ≦ +6, Carry Out = +4
     −2 ≦ A+B ≦ +2, Carry Out = 0
     −6 ≦ A+B ≦ −3, Carry Out = −4
Then A+B − (Carry Out) = −2, −1, 0, +1, +2
−3 ≦ [A+B − (Carry Out) + (Carry In)] ≦ +3

TABLE 5

INVERSE TRANSLATE

- INPUT: −2 ≦ $Z_I'$ ≦ +3
- For Negative Output, Change $Z_I'$ to −$Z_I'$
  Thus, −3 ≦ $Z_I'$ ≦ +3
- To Eliminate Negative Values, Use −1 = −2 + 1
  Thus $-3 \leq Z_I' \leq -1 \longrightarrow -1_I \text{OUT} = 1$ $Z_I' = 0 \longrightarrow -1_I \text{OUT} = -1_I \text{IN}$ $+1 \leq Z_I' \leq +3 \longrightarrow -1_I \text{OUT} = 0$

- $Z_I$ OUT is given by the Table

|         | $Z_I'$ |    |    |   |    |    |    |
|---------|----|----|----|---|----|----|----|
|         | +3 | +2 | +1 | 0 | −1 | −2 | −3 |
| −$1_I$ IN   1 | 2 | 1 | 0 | 3 | 2 | 1 | 0 |
|              0 | 3 | 2 | 1 | 0 | 3 | 2 | 1 |

TABLE 6

X = 23 = (0 1) (0 1) (1 1)
Y = 41 = (0 0) (1 0) (1 0) (0 1) = (0 1) (0 −1) (−1 0) (0 1)

|   |   |   |   |   |   | 0 | 1 | 0 | 1 | 1 | 1 |

TABLE 6-continued

X = 23 = (0 1) (0 1) (1 1)
Y = 41 = (0 0) (1 0) (1 0) (0 1) = (0 1) (0 −1) (−1 0) (0 1)

|   |   |   |   |   |   | −1 | 0 | −1 | −1 | −1 | 0 |   |   |
|   |   |   |   |   | 0 | −1 | 0  | −1 | −1 | −1 |   |   |   |
|   |   | 0 | 1 | 0 | 1 | 1  | 1  |    |    |    |   |   |   |
|   |   |   |   | 0 | 0 | −1 | 0  | −1 | 0  | 0  | −1 | 1 | 1 |
|   |   | 0 | 1 | 0 | 0 | 1  | 0  | −1 | −1 |    |    |   |   |
|   |   | 0 | 1 | 0 | 0 | 0  | −1 | 0  | −1 | 0  | −1 | 1 | 1 |
|   |   |   | 0 | 1 | 1 | 1  | 0  | 1  | 0  | 1  | 1  | 1 | 1 |

TABLE 7

Y = −493 = Abs. Val. (1000010011) = (0 1) (1 1) (1 0) (1 1) (0 1)
X = 310 = (0 1) (0 0) (1 1) (0 1) (1 0)
T(Y) = 2 −1 −1 1

|    |    |    |   |    |    |    |    | 0  | 1  | 0  | 0  | 1  | 1  | 0  | 1  | 1  | 0  |
|    |    |    |   |    |    |    | 0  | −1 | 0  | 0  | −1 | −1 | 0  | −1 | −1 | 0  |    |
|    |    |    |   |    |    | 0  | −1 | 0  | 0  | −1 | −1 | 0  | −1 | −1 | 0  |    |    |
|    |    |    |   | 0  | 0  | 0  | 0  | 0  | 0  | 0  | 0  |    |    |    |    |    |    |
|    |    | 1  | 0 | 0  | 1  | 1  | 0  | 1  | 1  | 0  | 0  |    |    |    |    |    |    |
|    |    |    |   |    |    |    |    |    | 1  | 0  | 3  | 1  | 2  |    |    |    |    |
|    |    |    |   |    |    |    | −1 | 0  | −3 | −1 | −2 |    |    |    |    |    |    |
|    |    |    |   |    |    | −1 | 0  | −3 | −1 | −2 |    |    |    |    |    |    |    |
|    |    |    | 0 | 0  | 0  | 0  |    |    |    |    |    |    |    |    |    |    |    |
|    | 2  | 1  | 2 | 3  | 0  |    |    |    |    |    |    |    |    |    |    |    |    |
|    |    |    |   | −1 | 0  | +1 | 2  | −1 | +2 |    |    |    |    |    |    |    |    |
|    |    | 0  | −1| −1 | +1 | −1 | −2 |    |    |    |    |    |    |    |    |    |    |
|    | 2  | 1  | 2 | 3  | 0  |    |    |    |    |    |    |    |    |    |    |    |    |
|    |    | 0  | −1| −2 | +1 | 0  | 0  | −1 | +2 |    |    |    |    |    |    |    |    |
| 2  | 1  | 2  | 3 | 0  |    |    |    |    |    |    |    |    |    |    |    |    |    |
|    | 2  | +1 | +1| +1 | +1 | 0  | 0  | −1 | +2 |    |    |    |    |    |    |    |    |
| 0  | 1  | 0  | 0 | 1  | 0  | 1  | 0  | 1  | 0  | 0  | 1  | 1  | 1  | 1  | 1  | 1  | 0  |
|    | −2 | −1 | −1| −1 | −1 | 0  | 0  | +1 | −2 |    |    |    |    |    |    |    |    |
| −1 | 0  | 1  | 1 | 0  | 1  | 0  | 1  | 0  | 1  | 1  | 0  | 0  | 0  | 0  | 0  | 1  | 0  |

Having thus described our invention, what we claim as new, and desire to secure by Letters Patent is:

1. An improved multiplier for multiplying a first operand Y times a second operand X, comprising:

a Booth-type translator having an input connected to receive the first operand Y having 2N binary bits $Y_j$, for translating the binary expression for the sequence of N pairs ($Y_{j+1}$, $Y_j$) of said first operand Y into a sequence of N signed digits $Y_j'$ said translator operating on positive 2's complement numbers, to translate for Y,

| $Y_{j+1}$ | $Y_j$ | $Y_{j-1}$ | $Y_j'$ |
|-----------|-------|-----------|--------|
| 1 | 1 | 1 | 0 |
| 1 | 1 | 0 | −1 |
| 1 | 0 | 1 | −1 |
| 1 | 0 | 0 | −2 |
| 0 | 1 | 1 | +2 |
| 0 | 1 | 0 | +1 |
| 0 | 0 | 1 | +1 |
| 0 | 0 | 0 | 0; | a partial product generator having a first input connected to the output of said translator and its second input connected to receive said second operand X having 2M binary bits grouped into M pairs ($X_{I+1}$, $X_I$) expressed as the numerical value $X_I'$ of the respective pair, for multiplying said translated first operand times said second operand and outputting partial products consisting of signed digits, said partial product generator operating to multiply for $Y_j' = +2$; $X_I' \cdot Y_j' = +X'_{I-1}$ $Y_j' = -2$; $X_I' \cdot Y_j' = -X'_{I-1}$ $Y_j' = +1; X_I' \cdot Y_j' = +X_I'$ $Y_j' = -1; X_I' \cdot Y_j' = -X_I'$ $Y_j' = 0; X_I' \cdot Y_j' = 0$ to generate N×M partial products consisting of signed digits $X_I'$ times $Y_j'$;

an array of adders, each adder having an input connected to two outputs from said partial product generator, for adding a first signed digit $A = X_I'$ times $Y_j'$ of a first partial product, to a second signed digit $B = X_{i'} \cdot Y_j'$ of a second partial product, providing a sum consisting of a sequence of signed digits, each adder operating on INPUTS:
  $-3 \leq A \leq +3$
  $-3 \leq B \leq 3$
  Carry In $= -1, 0, +1$
and generating
OUTPUTS:
  Carry Out $= -4, 0, +4$ Independent of Carry In
  $-3 \leq C \leq +3$
so that
  For $+3 \leq A+B \leq +6$, Carry out $= +4$
  $-2 \leq A+B \leq +2$, Carry Out $= 0$
  $-6 \leq A+B \leq -3$, Carry Out $= -4$
  the result is $A+B-(Carry\ Out) = -2, -1, 0, +1, +2$
  $-3 \leq \{A+B-(Carry\ Out)+(Carry\ In)\} \leq +3$ said sequence of signed digits output from said array of adders being the full product $Z'$ expressed as a plurality of $M+N-1$ signed digits $Z_I'$;

an inverse translator having an input connected to the output of said adders, for operating on said sequence of signed digits $Z_I'$ output from said adders, for providing a conventional binary expression Z OUT expressed as the value $Z_I'$ of pairs of adjacent binary numbers for the product of said first and second operands, said inverse translator operating on an input $-2 \leq Z_I' \leq +3$ and eliminating negative values, by using $-1 = -2+1$ to generate an output where $Z_I$ is given by the Table $Z_I'$

|  | +3 | +2 | +1 | 0 | −1 | −2 | −3 |
|---|---|---|---|---|---|---|---|
| $1_I$ IN 1 | 2 | 1 | 0 | 3 | 2 | 1 | 0 |
| 0 | 3 | 2 | 1 | 0 | 3 | 2 | 1; | where the value $1_I$IN is a binary "1" if there is a minus carry in and is a "0" if there is no minus carry in.

2. An improved multiplier for multiplying a first operand Y times a second operand X, comprising:

a Booth-type translator having a first input connected to receive the first operand Y having 2N binary bits $Y_j$, a second input connected to receive the second operand X having $2_m$ binary bits $X_I$, said translator translating the binary expression for the sequence of N pairs $(Y_{j+1}, Y_j)$ of said first operand Y into a sequence of N signed digits $Y_j'$ said translator operating on positive 2's complement numbers, to translate for Y,

| $Y_{j+1}$ | $Y_j$ | $Y_{j-1}$ | $Y_j'$ |
|---|---|---|---|
| 1 | 1 | 1 | 0 |
| 1 | 1 | 0 | −1 |
| 1 | 0 | 1 | −1 |
| 1 | 0 | 0 | −2 |
| 0 | 1 | 1 | +2 |
| 0 | 1 | 0 | +1 |
| 0 | 0 | 1 | +1 |
| 0 | 0 | 0 | 0 | for j even; said translator also translating the binary expression for the sequence of M pairs $(X_{I+1}, X_I)$ of said second operand X into a sequence of M signed digits $X_I'$ said translator operating on positive 2's complement numbers, to translate for X

| $X_{I+1}$ | $X_I$ | $X_{I-1}$ | → | $X_I'$ |
|---|---|---|---|---|
| 1 | 1 | 1 |  | 0 |
| 1 | 1 | 0 |  | −1 |
| 1 | 0 | 1 |  | −1 |
| 1 | 0 | 0 |  | −1 |
| 0 | 1 | 1 |  | +2 |
| 0 | 1 | 0 |  | +1 |
| 0 | 0 | 1 |  | +1 |
| 0 | 0 | 0 |  | 0 | translating X for every I;

a partial product generator having a first and second inputs connected to the outputs of said translator, for multiplying said translated first operand times said second translated operand and outputting partial products consisting of signed digits, said partial product generating operating to multiply for $Y_j' = +2; X_I' \cdot Y_j = +X_{I-1}'$ $Y_j' = -2; X_I' \cdot Y_j = -X_{I-1}'$ $Y_j' = +1; X_I' \cdot Y_j' = +X_I'$ $Y_j' = -1; X_I' \cdot Y_j' = -X_I'$ $Y_j' = 0; X_I' \cdot Y_j' = 0$ to generate N×M partial products consisting of signed digits $X_I'$ times $Y_j'$;

an array of adders, each adder having an input connected to two outputs from said partial product generator, for adding a first signed digit $A = X_I'$ times $Y_j$ of a first partial product, to a second signed digit $B = X_{i''} $ times $Y_j'$ of a second partial product, providing a sum consisting of a sequence of signed digits, each adder operating on INPUTS:
  $-2 \leq A \leq +3$
  $-2 \leq B \leq +3$
  Carry In $= -1, 0, +1$
and generating
OUTPUTS:
  Carry Out $= -4, 0, +4$ Independent of Carry In
  $-2 \leq C \leq +3$
so that for
  $+3 \leq A+B \leq +6$, Carry out $= +4$
  $+1 \leq A+B \leq +2$, Carry out $= 0$
  $-4 \leq A+B \leq -2$, Carry out $= -4$
the result is
  $A+B-(Carry\ out) = -1, 0, +1, +2$
  $-2 \leq [A+B-(Carry\ out)+(Carry\ In)] \leq +3$ said sequence of signed digits output from said array of adders being the full product Z' expressed as a plurality of N+N−1 signed digits $Z_I'$;

an inverse translator having an input connected to the output of said adders, for operating on said sequence of signed digits $Z_I'$ output from said adders for providing a conventional binary expression Z OUT expressed as the value $Z_I'$ of pairs of adjacent binary numbers for the product of said first and second operands, said inverse translator operating on an input $-2 \leq Z_I' \leq +3$ and eliminating negative values, by using $-1 = -2 + 1$ to generate an output where $Z_I$ is given by the Table

| $-1_I$ IN | | +3 | +2 | +1 | 0 | −1 | −2 | −3 |
|---|---|---|---|---|---|---|---|---|
| | 1 | 2 | 1 | 0 | 3 | 2 | 1 | 0 |
| | 0 | 3 | 2 | 1 | 0 | 3 | 2 | 1; | where the value $-1_I$ IN is a binary "1" if there is a minus carry in and is a "0" if there is no minus carry in.

* * * * *